(12) United States Patent
Zadravec (10) Patent No.: US 7,483,208 B2
(45) Date of Patent: Jan. 27, 2009

(54) MULTIFUNCTIONAL OBSERVATION DEVICE

(75) Inventor: Dusan Zadravec, Rebstein (CH)

(73) Assignee: Vectronix AG, Heerbrugg (CH)

( * ) Notice: Subject to any disclaimer, the term of this patent is extended or adjusted under 35 U.S.C. 154(b) by 250 days.

(21) Appl. No.: 11/180,549

(22) Filed: Jul. 14, 2005

(65) Prior Publication Data

US 2007/0014003 A1    Jan. 18, 2007

(51) Int. Cl.
*G02B 23/12* (2006.01)
(52) U.S. Cl. ........................... 359/407; 359/399
(58) Field of Classification Search ............... 359/399, 359/405, 407, 409, 426
See application file for complete search history.

(56) References Cited

U.S. PATENT DOCUMENTS

| | | | | |
|---|---|---|---|---|
| 2,920,136 | A * | 1/1960 | Peterson | 348/164 |
| 3,712,702 | A |   1/1973 | Schmidt | |
| 5,621,567 | A |   4/1997 | Quint et al. | |
| 6,248,988 | B1 * | 6/2001 | Krantz | 250/201.3 |
| 2001/0028450 | A1 * | 10/2001 | Zadravec | 356/4.01 |
| 2003/0002149 | A1 |   1/2003 | Watanabe | |
| 2004/0021938 | A1 * | 2/2004 | Filipovich et al. | 359/409 |
| 2004/0046953 | A1 |   3/2004 | Nagata et al. | |
| 2004/0095471 | A1 |   5/2004 | Heintz | |

FOREIGN PATENT DOCUMENTS

| | | |
|---|---|---|
| EP | 0 469 942 | 2/1992 |
| JP | A 01-266505 | 10/1989 |
| JP | 11-064741 | * 3/1999 |
| JP | A 11-064741 | 3/1999 |
| RU | 2158433 C1 | 10/2000 |

* cited by examiner

*Primary Examiner*—Joshua L Pritchett
(74) *Attorney, Agent, or Firm*—Oliff & Berridge, PLC (57) ABSTRACT

In an observation device according to the invention, it is possible to coordinate a multiplicity of functions with the device by using and exchanging optical modules. By means of existing optical components in the observation device, transmitted and/or received beams of the modules can be reflected in and/or reflected out. For example, field glasses, binoculars and measuring glassed can be equipped according to the invention with modules. The modules can be produced for special purposes, can be carried in particular as convenient units and can be inserted into the device and removed therefrom an can be exchanged. An optical module may be, for example, in the form of a camera, graphic display or IR laser. The modular multifunctional observation device according to the invention can be designed as a compact and light device by using optical components already present in the "basic system."

72 Claims, 5 Drawing Sheets

MULTIFUNCTIONAL OBSERVATION DEVICE

The invention relates to a multifunctional observation device according to the preamble of claim 1.

A very wide range of instruments for, for example, military or geodetic purposes are known as observation devices. In general, such devices have further functions in addition to the observation function, for example target plates for military applications or for hunting purposes, integrated telemeters and direction finders, etc. Because the instruments are to be as light, compact and convenient as possible for many applications, these instruments are often in the form of binoculars/field glasses having special functions for special intended uses in each case. Different special devices are often required for a mission. Thus, it may be necessary for a user to carry a plurality of devices with him, which is undesired particularly in the case of military deployments. An observation device which can be used for a plurality of applications, in particular can be used for two or more applications simultaneously, without losing the compactness and convenience would be advantageous.

It is the object of the present invention to provide a multifunctional observation device without considerably increasing the optical complexity, volume and weight and without substantial intervention in the basic optical system and hence modification of the basic optical system.

This object is achieved, according to the invention, by realizing the defining features of claim 1 or of the dependent claims, or the achievements are further developed.

The invention provides an observation device, in particular a day/night vision device, which can be equipped with further functions in addition to the observation function. The designation observation device does not rule out the fact that the device may also have measuring functions. According to the invention, the observation device is formed in such a way that modular upgrading of the device is permitted. In particular, optical modules can be easily introduced, for example pushed or inserted, into the device. The device and the optical modules are formed in such a way that existing optical components of the observation device can also be used for the modules introduced. Such an integration of a plurality of functions into one device with the use of existing elements saves, inter alia, volume and weight and permits the provision of a light and convenient device. In particular, an observation device according to the invention has the convenience of field glasses.

An observation device having modular upgradability according to the invention may be in the form of a commercial instrument, for example binocular field glasses. In particular, high-performance measuring binoculars, such as those of the Vektor series from Vectronix AG in Heerbrugg, Switzerland, can also be upgraded or equipped according to the invention. Laser telemeter, digital compass and tilt meter have already integrated in the binoculars of the Vektor series.

The degree of upgrading or equipping can be adapted to the respective intended use. In general, any desired optical observation or measuring devices can be equipped according to the invention with modules; a precondition is a suitable formation and arrangement of the optical components in the device.

Thus, it is intended according to the invention to utilize or to form and to arrange at least one optical deflection means of an observation and/or measuring instrument in such a way that transmitted and/or received beams of additional optical modules can be reflected in and/or out by the deflection means. The additional modules are in the form of external modules and, according to the invention, can be used in the device. In relation to the modules, transmitted beams are designated as optical beams which emanate from/are emitted by a module, such as, for example, a laser transmitter or a graphic display, and received beams are designated as beams which are received by a module, such as, for example, a camera.

In a binocular telescope having two optical telescope systems, in particular two deflection means can be used according to the invention. Deflection means are understood as meaning optical elements for changing the direction of optical beams, such as mirrors or prisms. The deflection means can of course also be in the form of beam splitters, in particular coated on one or both sides, or having preceding or subsequent filters; in general, optical reflective and/or refractive units by means of which optical beams can be reflected into observation channels of the observation device and/or reflected out of said channels are suitable. Observation channel of the observation device is to be understood as meaning the optical beam path between lens unit and eyepiece unit of the device. The optical beam path between first lens unit and first eyepiece unit is referred to as first observation channel, and the optical beam path between second lens unit and second eyepiece unit is referred to as second observation channel. If the observation device is in the form of a day/night vision device, an amplifier channel having a light amplifier, in particular low-light-level amplifier, for amplifying night vision observation beams in a known manner is provided between first and second observation channel. When the term deflection means is used, the description can just as well be applied to a single deflection means, and vice versa.

The deflection means are designed in such a way that their position or place in the device can be adjusted; in particular, the deflection means can be positioned into and out of the observation channel(s), for example swiveled out and swiveled in. A design of a day/night vision device having deflection mirrors which can be swiveled out and swiveled in, and the swiveling out and swiveling in mechanism thereof, are described, for example, in EP 0 469 942.

With two positionable deflection means in a binocular observation device, the functionality thereof can be further increased. For example, a binocular observation and/or measuring telescope is formed in such a way that, when the deflection means are swiveled in, i.e. the deflection means are not positioned in the respective observation channel of the telescope, the telescope can be used as a day vision device and observation is possible via both optical telescope systems. In the case of a telescope such as the Vektor series, a distance and direction determination is possible with the telescope in addition to visual observation, the display values of which determination can moreover be deflected into the beam path to the eyepiece.

When the deflection means are swiveled in—in the form of a swivelable mirror in a possible embodiment—an undisturbed observation with two eyes is therefore possible. If a deflection means is now moved into the first observation channel, beams of an optical module used in the device can be guided by this deflection means, while the visual observation can be continued undisturbed in the second observation channel.

An optical module may be, for example, a display, in particular a graphic display. Images, for example images recorded by means of a thermal image camera or CCD camera, can be input onto the display, for example via a cable connection or a wireless connection, such as radio or bluetooth. The display image can then be guided into an observation channel of the observation device and further to the eyepiece unit by the deflection means. Thus, the environment or an object, etc. can be observed as an observation image with one eye, and an additional module image, for example a camera picture, can be observed with the other eye. If the image input onto the display provides orientation information, for example in the form of a map, or if the optical module contains stored environmental information, for example reference points of the terrain to be reconnoitered for self orientation, an observation can rapidly and reliably call up position information, even without being reliant upon undisturbed satellite reception for GPS. However, in the case of GPS coupled to a module, it is also possible to input GPS orientation information for the observer, or optionally a module in the form of a satellite receiver can be used according to the invention in the device. With an environment map projected in as a module image, better orientation is permitted for the observer. Advantageously, the information can be called up very easily and rapidly—for example at the press of a button—without having to interrupt the visual observation. The optical parameters in the case of image projection and the imaging properties of the pictures are furthermore advantageously matched so that the module image input and the observation image have the same imaging scale, and a superposed or fused image of input module image and observation image can be observed by the observer. If images of, for example, a CCD camera or a thermal image camera are input onto the display and are furthermore made available to the observer together with an observation image, CCD camera and thermal image camera are coupled to the device in particular in such a way that the optical axes of camera and device point in the same direction.

In an embodiment, the observation device according to the invention is designed in such a way that transmitted beams of a second optical module can be reflected by a second deflection means in the second observation channel into the second observation channel and to the second eyepiece. In the first observation channel, transmitted beams of a first optical module are reflected by a first deflection means and the first lens unit of the first observation channel out of the device, and/or received beams projected via the first lens unit into the first observation channel can be reflected by the first deflection means out of the first observation channel to the first optical module. Pencils of rays reflected out to the first optical module can serve for photographic recordings or, for example, CCD/CMOS or camera pictures. For example, laser beams of a laser transmitter, such as a visible laser or a pulsating IR laser (as first optical module), in particular for coded or non-coded illuminations of the observed scene, can be reflected out of the device. The first module, too, is in the form of a laser telemeter (comprising transmitter and receiver), beams for distance measurement being deflectable via the first deflection means and the first lens unit toward an object, and beams reflected by the object in turn being guidable via the first lens unit and the first deflection means to the telemeter. The deflection means can be swiveled out or in alternatively for the day vision observation (or according to the intended use).

The deflection means are preferably provided with a coating, such as a dielectric layer, or are coated on both sides. With corresponding coating(s), two-eye observation of a scene together with observation of a module image is even feasible. It is clear to the person skilled in the art how and by means of which coatings the reflectivity and/or transmittivity of optical components can be changed, and hence how coatings, and which coatings, can be used according to the respective applications or modules. Coating techniques and coating materials and the extended functionality of the device which is achievable thereby will therefore not be explained further at this point.

In the case of night observation, in one embodiment both deflection means are positioned in the respective observation channel. Incident light is deflected in the second observation channel via the second deflection means into the amplifier channel and onto the window of incidence of a low-light-level amplifier, passes as an amplified image through the exit of the low-light-level amplifier and is deflected via the first deflection means into the first observation channel and into the first eyepiece and is projected into the observer's eye. The first and second deflection means are therefore so to speak "active" and can be used in the functions already described. In particular, in the case of night observation, thermal image information which can be projected by the second deflection means via the second eyepiece—which in any case is not "active" in the case of a night observation—into the observer's eye is advantageous. The embodiments having the designation "first" and "second" components are chosen purely by way of example for greater clarity so that of course "first" components can be equally well designated as "second" components, or vice versa.

According to the invention, an observation device can therefore be equipped with a variety of functions without substantial intervention in the optical "basic system" of the observation device being required, i.e. a "basic device" can so to speak be upgraded according to the invention. The basic system remains substantially unchanged, and the additional functions can be integrated into the device as modules and can be removed therefrom and exchanged. The user therefore has the possibility of carrying with him a single device—in particular in the form of field glasses—and additional advantageous optical equipment in the form of convenient and light modules, instead of a plurality of device-like pieces of equipment.

The multifunctional observation device according to the invention is described in more detail purely by way of example below with reference to specific embodiments shown schematically in the drawings, further advantages of the invention being discussed. Specifically.

Figure 1A:
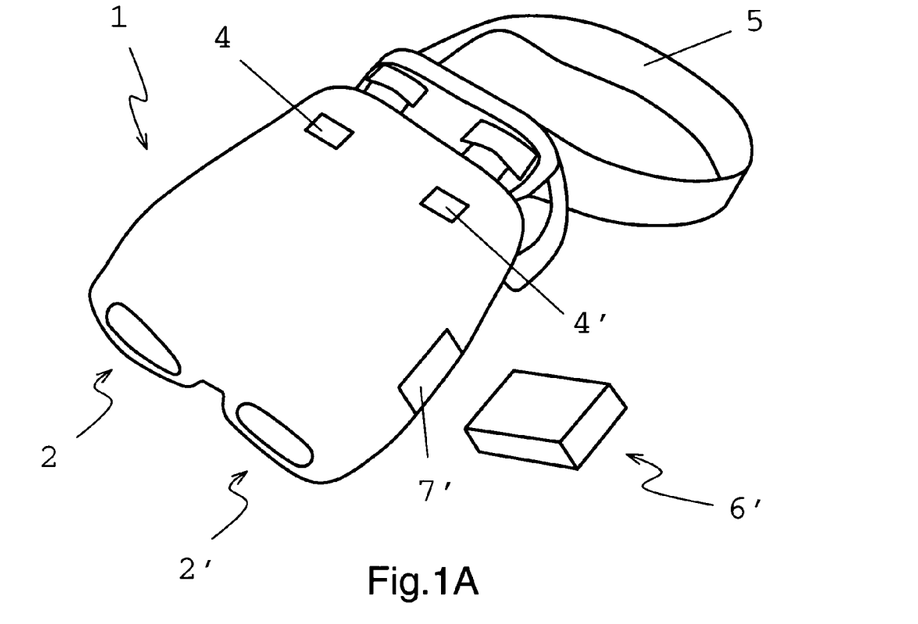
FIG. 1A shows a possible embodiment of an observation device according to the invention, comprising optical modules, in partial plan view.

FIG. 1A shows a possible embodiment of an observation device according to the invention. Here, the observation device is in the form of binoculars 1, for example in the manner of binoculars of the Vektor series. According to the invention, the telescope is formed in such a way that optical modules can be integrated. In the binoculars 1 shown here and comprising two optical telescope systems 2, 2', a module can be coordinated in each case with each optical system, only the second module 6' being visible in the view of FIG. 1A. For integration of the second module 6' in the binoculars 1, a second module opening 7' is provided on the device, into which opening the second module 6' can be easily inserted, pushed or "clicked". In the diagram, the second module 6' is shown schematically as a cuboid. Since the modules are each formed with an optical system—which in some cases are highly complex—housings for the modules will generally be provided. The modules can then, for example, easily be removed from the housing and inserted into the binoculars 1—the opening in the binoculars 1 may have a cover, such as, for example, for a battery compartment. It is evident that, in spite of the upgrading, according to the invention, of the binoculars 1, the latter is a compact device for easy carrying or suspending by means of a belt 5. Furthermore, the device can be conveniently and clearly operated—functions of the second module 6' and of a first module not visible in this view can be activated or deactivated by means of a second and first button 4', 4.

Figure 1B:
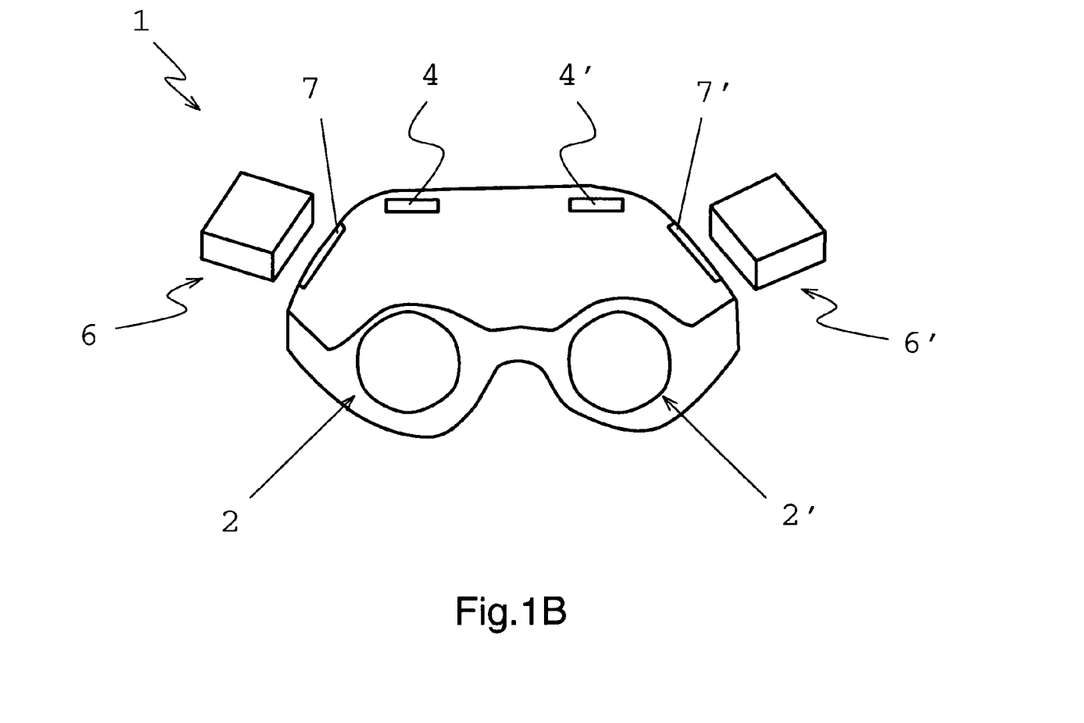
FIG. 1B shows the embodiment from FIG. 1A in front view and partial plan view.

FIG. 1B shows the binoculars 1 from FIG. 1A. In this diagram, the first module opening 7 and the first module 6 are evident. The modules are pushed into the binoculars 1 laterally from the right and left. The binoculars 1 could also have the openings for the modules on its top or bottom. By means of the two buttons 4, 4', functions of the modules are activated or deactivated, for example by switching a transmitter or receiver in the form of a module on or off by actuating the respective first or second button 4, 4'. For actuation of the modules, in each case a first or second optical component of the binoculars 1 must be appropriately positioned. Thus, a first deflection means is positioned—for example mechanically—in such a way that the first optical module 6 can be used in its function. The same applies to the second optical component and the second optical module 6'. With the installation of small motors, the corresponding optical components can also be electronically positioned.

The module may have different functions and can also be exchanged for other further modules. For example, the second module 6' can be in the form of a graphic display whose image can be deflected via the second optical component—the second deflection means—to the observer. The first module 6 may be a laser transmitter—for example for illuminating a scene. The modules may also be in the form of a CCD camera or thermal image camera. Of course, corresponding optical elements of the device must be formed so as to be permeable to heat radiation for an integrated thermal image camera. Further buttons/control knobs can also be provided on the observation device—optionally with regard to further or additional control functions of modules which may be used. Thus, in the case of a design, according to the invention, of high-performance binoculars of the Leica Vektor series, buttons for distance and direction measurement are present on the binoculars.

Figure 1C:
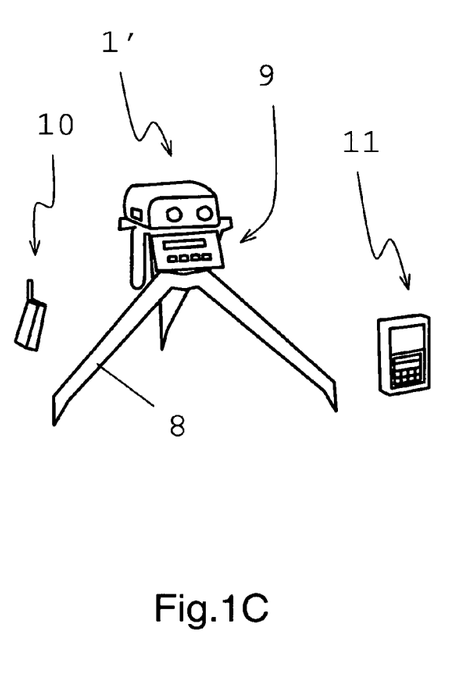
FIG. 1C shows an observation device according to the invention in combination with a tripod and additional measuring, data processing and control devices.

FIG. 1C shows an observation device according to the invention as telescope 1' in an embodiment for non-hand-held use with accessories. The telescope 1' is mounted on a magnetic tripod 8, devices for angle adjustment and angle measurement and a computing device 9 having optical software being coordinated with the tripod 8. The computing device 9 can also communicate with external units, such as a GPS 10 or a control unit 11. In the computing device 9, it is furthermore possible to store correction tables for increasing the accuracy during the evaluation of measurements.

Figure 1D:
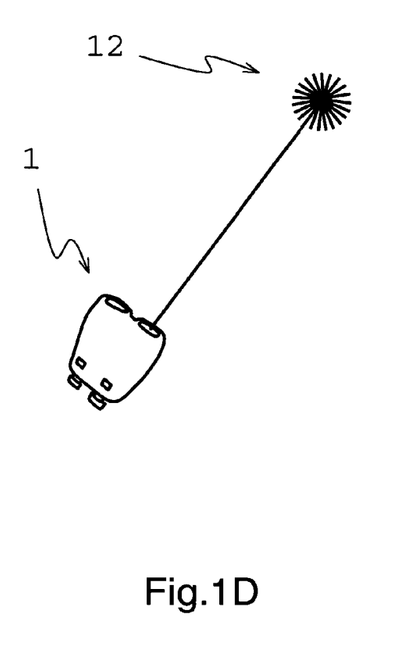
FIG. 1D shows the observation device from FIG. 1A comprising a laser transmitting module on illumination, FIG. 2A schematically shows the optical design of an embodiment of an observation device according to the invention in the night vision position with a first and second optical module.

The binoculars 1 from FIG. 1A, 1B as an observation device according to the invention during emission of a laser signal 12 is shown in FIG. 1D. The first module 6 from FIG. 1B is in the form of a laser transmitter here.

Figure 2A:
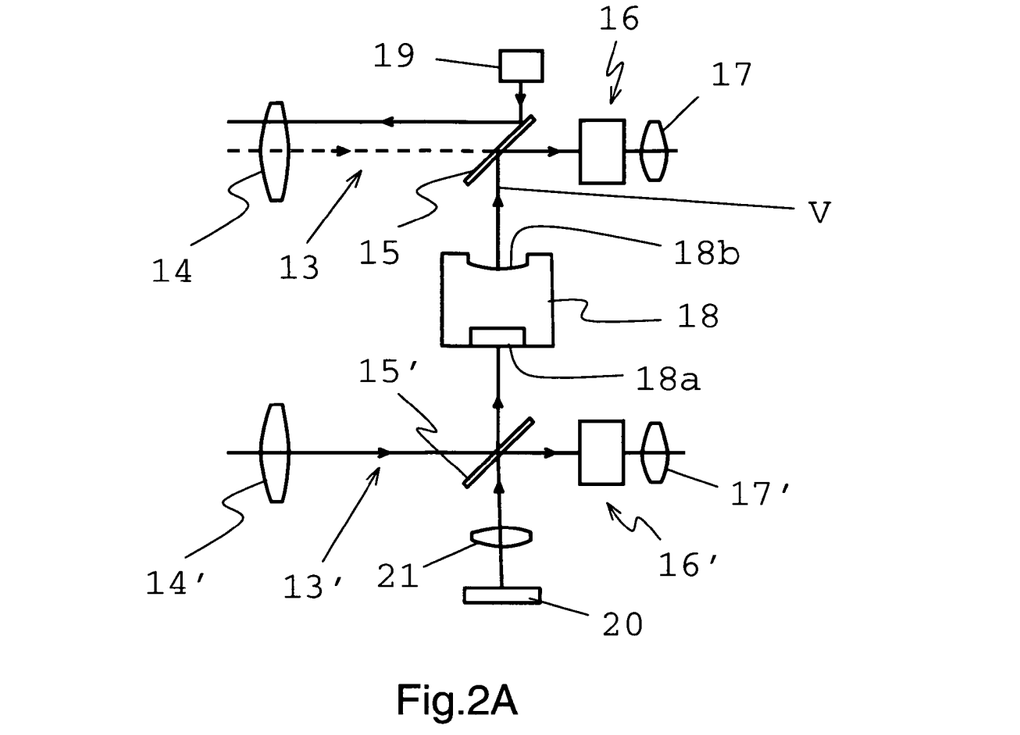

FIG. 2A shows the principle of an observation device according to the invention, comprising modules. A possible design comprising optical components and optical modules integrated according to the invention is shown schematically. Lens, reversal and eyepiece units 14, 14', 16, 16', 17, 17' are shown schematically in FIGS. 2A-3D by a lens or prism which will generally be formed from a lens or prism system or from optical assemblies. The size of the designs shown is also purely by way of example. The optical arrangement is arranged in particular in a housing as shown in FIGS. 1A-1D.

FIG. 2A shows the observation device in the night vision position. In each case a deflection mirror 15, 15' as a deflection means is positioned in the "active" position in each case in the first and second observation channel 13, 13'. The first and second observation channel 13, 13' is defined in each case as the optical beam path between first and second lens unit 14, 14' and first and second eyepiece unit 17, 17'. In this embodiment, in the night vision position, only optical beams received in the second observation channel 13' are observed as images. In the case of appropriately transparent or partly transparent first deflection means, observation would also be possible via the first observation channel 13. The second lens unit 14' focuses the beams emanating from an object/environment to be observed onto the second deflection mirror 15', and the beams are deflected by beams of the second deflection mirror 15' into an amplifier channel V and onto the entrance window 18a of a low-light-level amplifier 18. In the low-light-level amplifier 18, the image of the object/environment is electronically amplified, therefore appears as a brighter visible image on the exit window 18b and is projected by the first deflection means 15 into the first observation channel 13, and via an image inversion system and the first eyepiece unit 17 into an observer's eye. By means of the active position of the first and second deflection mirror 15, 15', further optical beams can now be reflected in and out of the device. Here, modules used according to the invention in the device are in the form of graphic display 20 and in the form of laser transmitter 19. The graphic display 20 as a second module displays an image via the second deflection mirror 15' and second inversion and eyepiece unit 16', 17' to the observer. A lens system 21 for focusing the display image (as a module image) in the second eyepiece is also coordinated with the graphic display 20. The image transmitted by the graphic display 20 may be, for example, an image recorded by a thermal image camera and fed to the display, or location information—for example in the form of a map. Position coordinates received by means of a GPS could also be shown on the display and to the observer. The first optical module is in the form of laser transmitter 19 for emitting transmitted beams. Via the first deflection mirror 15, laser radiation is deflected in the first observation channel 13 to the first lens unit 14 and via this out of the observation device. Thus, a user can illuminate the observed scene/the observed object with a more or less focused laser beam. Dashed lines in FIGS. 2A-3D represent optical beams which—in the respective diagrams—do not reach the observer.

Figure 2B:
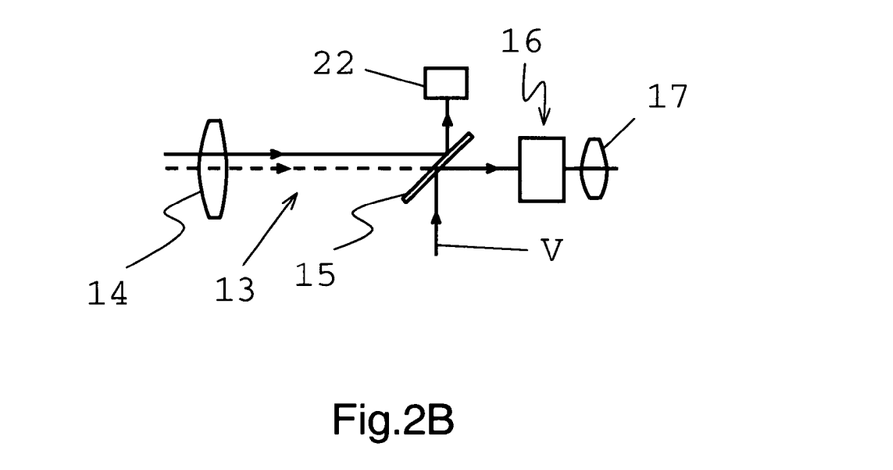
FIG. 2B shows the design from FIG. 2A with a differently formed first optical module, FIG. 3A schematically shows the optical design of the observation device according to the invention from FIG. 2A with the first and second optical module in the day vision position for two-eye observation.

FIG. 2B shows—in part—the "basic design" of FIG. 2A, but instead of the laser transmitter, a camera 22, such as a CCD camera, is used as the first optical module in the observation device according to the invention. Beams received via the first lens unit 14 are deflected as received beams via the first deflection mirror 15 to the camera 22 and recorded as an image. FIGS. 2A and 2B show that, according to the invention, undisturbed (one-eye) visual observation of an object and/or of an environment can take place, and the recording and/or playback of additional information is also permitted. In particular, the recording and/or playback of additional information can take place without having to interrupt the visual observation. In the development of FIGS. 2A and 2B, three functions can be simultaneously performed with the device according to the invention. Also advantageous is the common optical system for observation and module transmitted and/or received beams. Thus, the system is simplified and is kept free of superfluous glass weight.

Figure 3A:
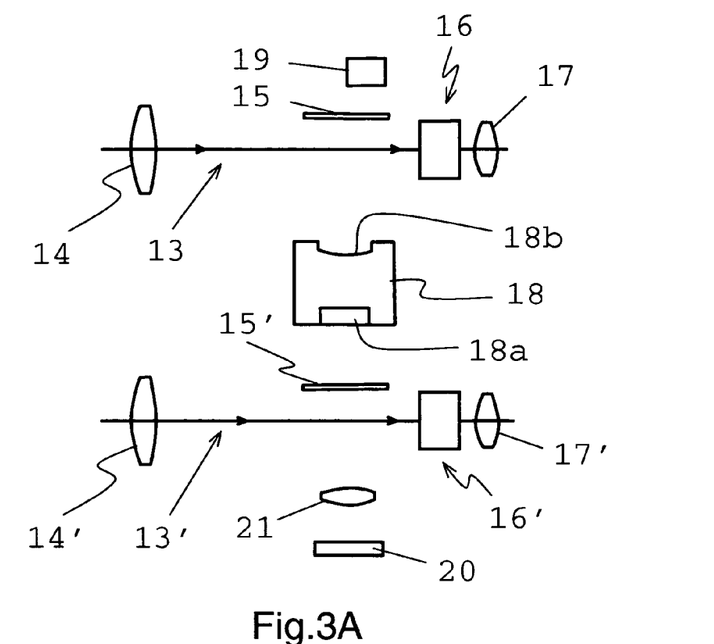

In the day vision position, too, a plurality of possible functions can be selected with an observation device according to the invention. FIG. 3A shows the device in the embodiment of FIGS. 2A and 2B in the day vision position for pure observation. The deflection means—the first and second deflection mirrors 15, 15'—are "deactivated"; they have been moved (swivelled in) out of the first and second observation channels 13, 13'. With this positioning of the deflection means outside the respective observation channels, the observation device can be used like simple binoculars for observation. If the user desires a further function of the binoculars, he can activate the modules integrated according to the invention. Depending on requirements, a camera, a transmission device, a display, etc. can be incorporated into the device. FIG. 3A shows the graphic display 20 and the laser transmitter 19 from FIG. 2A.

Figure 3B:
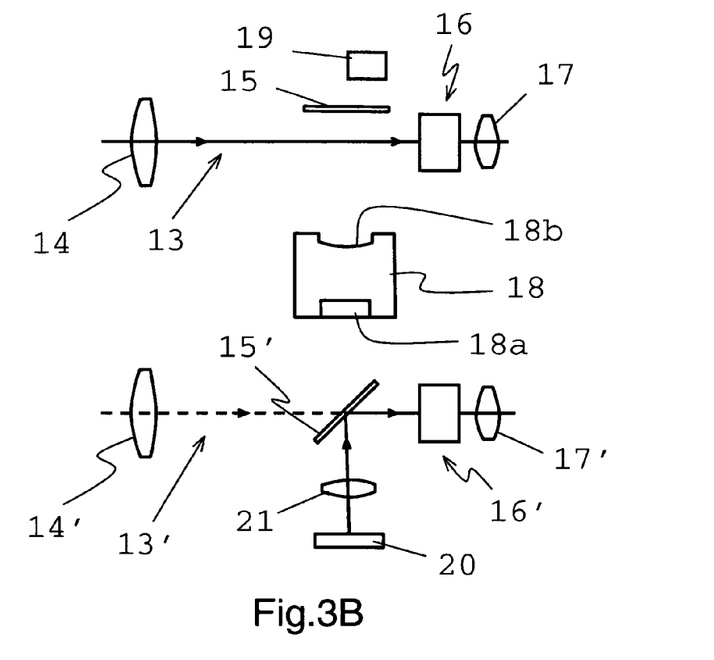
FIG. 3B shows the design from FIG. 3A for one-eye observation with second deflection means swivelled out for "activation" of the second optical module.

FIG. 3B shows the observation unit according to the invention with activated second module. By means of the press of a button/turn of a knob, the second deflection mirror 15' can be swivelled into the second observation channel 13'. Consequently, one-eye observation via the first observation channel 13 and viewing of an image input from the graphic display 20 as a second module into the second observation channel 13' are now possible. If the observed image and the display image have the same imaging scale, a so-called fused image can occur in the observer's view. The observer can thus, for example, superpose the directly observed image on a camera image. In order to superpose the observed image—for example—on the camera image of the same scene, a camera is coupled to the observation device in such a way that the optical axes of camera and observation device point in the same direction.

Figure 3C:
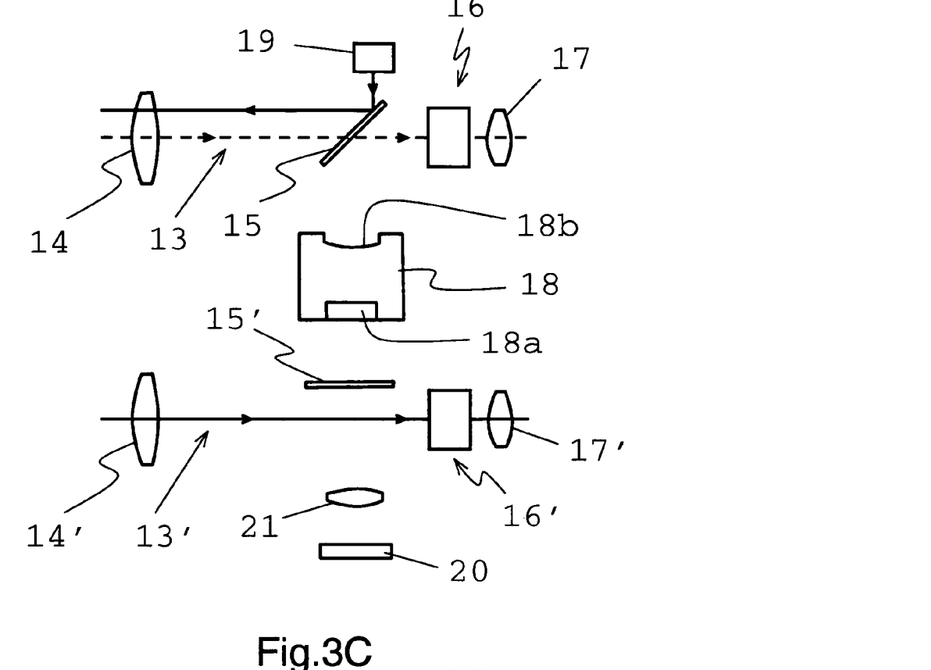
FIG. 3C shows the design from FIG. 3A for one-eye observation with first deflection means swivelled out for "activation" of the first optical module, and FIG. 3D schematically shows the optical design of an embodiment of an observation device according to the invention with first and second deflection means swivelled out.

In FIG. 3C, the second model is deactivated, but the laser transmitter 19 is in operation as a first module through the first deflection mirror 15 positioned in the first observation channel 13. Thus, for example, a signal can be emitted in the manner shown in FIG. 1D, and observation activity can take place via the second observation channel 13'. With a first deflection means transparent for, for example, the visible wavelength range, observation via the first observation channel 13—and hence two-eye observation—would also be possible. Instead of the transmitter, it is just as possible to use (analogously to FIG. 2B) a camera—for day vision observation in particular a CCD camera—for receiving light collected via the first lens unit 14. Depending on the intended use, it is thus possible to change between modules, for example by switching the modules on and off by means of buttons/control knobs or by changing modules. Thus, instead of the camera, display and laser transmitter module mentioned by way of example, other optical assemblies—for example special modules formed for special applications—can be combined according to the invention with the observation device (or observation measuring device) and can be used. As a result of this possibility of multiple function, an extremely versatile observation device is provided, which is nevertheless compact, light, convenient and simple to operate. The development according to the invention can be used both on simple field glasses and on complicated high-performance binoculars, combined observation measuring devices (for example binoculars with integrated telemeter and/or compass, etc.), precision measuring instruments, etc.

Figure 3D:
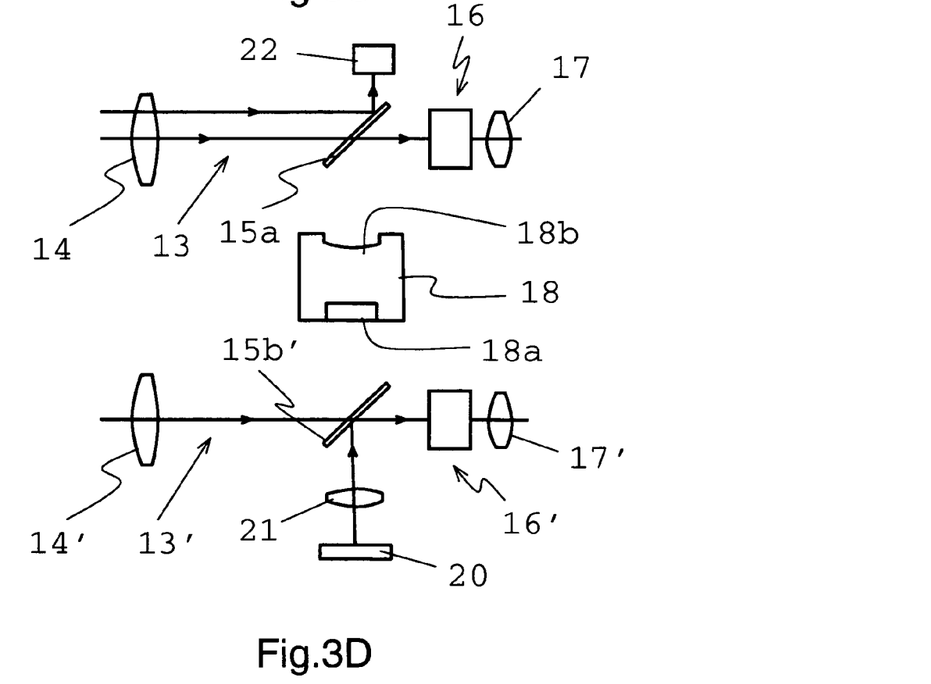

FIG. 3D shows the optical design of an embodiment of an observation device according to the invention, in which embodiment the second deflection means is in the form of a second deflection element 15*b'* coated on both sides, and the first deflection means is in the form of a first deflection element 15*a* which is partly transparent for a predetermined wavelength range—in this case substantially for the visible range of the electromagnetic spectrum. A camera 22 is integrated as a first module into the device. Beams collected by means of the first lens unit 14 are deflected via the first deflection element 15*a* on the one hand as received beams from the first receiving channel 13 to the camera 22 and on the other hand beams are allowed through to the first eyepiece unit 17. Thus, the modular function can be used in spite of the simultaneous observation function. The second deflection element 15*b'* is coated in this embodiment in such a way that radiation collected on the "object side" via the second lens unit 14' is allowed through to the observer, and on the "observer side" transmitted beams of a graphic display 20 as a second module are likewise deflected to the observer. Thus, for example, an image already superposed on the second eyepiece unit 17', in particular a fused image, can be provided. In this embodiment, for example, the camera image of the first module could be shown on the graphic display 20 and fed to the observer, who nevertheless can observe a scene undisturbed with two eyes.

Likewise, the chosen coatings of the respective deflection means can of course be chosen according to the purpose—for example transparent or reflective for a laser wavelength range or wavelength range of a thermal image device.

The invention claimed is:

1. An observation device, in the form of a day and night vision device, comprising a first observation channel for receiving optical beams, which beams can be projected into an observer's eye via a first lens unit, a first inversion unit and a first eyepiece unit coordinated with the first observation channel, a positionable first deflection means coordinated with the first observation channel, and a hollow space in the observation device for housing a first optical module, the hollow space opening out to the exterior of the observation device, wherein the first optical module for emitting or receiving transmitted or received beams can be inserted into and housed in the hollow space such that an exterior shape of the observation device is unchanged, the first optical module can be removed from the hollow space, the transmitted or received beams being deflectable via the first deflection means into the first observation channel or out of the first observation channel.

2. The observation device as claimed in claim 1, wherein the observation device comprises a second observation channel having a second lens unit, a second inversion unit and a second eyepiece unit and a second deflection means coordinated with the second observation channel.

3. The observation device as claimed in claim 2, wherein
   a second optical module for emitting transmitted beams can be inserted into the observation device and can be removed therefrom, and
   the transmitted beam can be deflected via the second deflection means into the second observation channel.

4. The observation device as claimed in claim 3, wherein
   optical beams received in the first or second observation channel can be observed as an observed image, and
   transmitted beams emitted by the second optical module can be observed in the second observation channel as a module image, observed image and module image having the same imaging scale.

5. The observation device as claimed in claim 3, wherein the first or second module comprises at least one of the following units
   graphic display,
   camera,
   thermal image device, and
   laser transmitter.

6. The observation device as claimed in claim 5, wherein the camera is a CCD or CMOS camera.

7. The observation device as claimed in claim 3, wherein the observation device is in the form of day/night vision device.

8. The observation device as claimed in claim 3, wherein an amplifier channel is present for connection of the first and second observation channels.

9. The observation device as claimed in claim 2, wherein an amplifier channel is present for connection of first and second observation channel.

10. The observation device as claimed in claim 9, wherein
    a low-light-level amplifier is arranged in the amplifier channel and
    optical beams received in the second observation channel can be deflected via the second deflection means, the low-light-level amplifier and the first deflection means to the first eyepiece unit.

11. The observation device as claimed in claim 10, wherein
    optical beams received in the first or second observation channel can be observed as an observed image, and
    transmitted beams emitted by the second optical module can be observed in the second observation channel as a module image, observed image and module image having the same imaging scale.

12. The observation device as claimed in claim 9, wherein
    optical beams received in the first or second observation channel can be observed as an observed image, and
    transmitted beams emitted by the second optical module can be observed in the second observation channel as a module image, observed image and module image having the same imaging scale.

13. The observation device as claimed in claim 2, wherein the first or second deflection means can be positioned into and out of the first or second observation channel.

14. The observation device of claim 13, wherein the first or second deflection means can be swiveled or pivoted into and out of the first or second observation channel.

15. The observation device as claimed in claim 2, wherein the observation device comprises a first or second electronic or mechanical switching device for positioning the first or second deflection means.

16. The observation device of claim 15, wherein the first or second electronic or mechanical switching device swivels in and out the first or second deflection means.

17. The observation device as claimed in claim 2, wherein the first or second deflection means are in the form of first or second deflection mirrors.

18. The observation device of claim 17, wherein the first or second deflection mirrors are swivellable deflection mirrors.

19. The observation device as claimed in claim 2, wherein the first or second deflection means have a coating at least on one side by means of which coating the reflectivity or transmittivity for predetermined wavelength ranges is increased or decreased.

20. The observation device as claimed in claim 19, wherein the first or second deflection means have a coating on both sides.

21. The observation device as claimed in claim 2, wherein the first or second module comprises at least one of the following units
    graphic display,
    camera,
    thermal image device,
    laser transmitter.

22. The observation device of clam 21, wherein the camera is a CCD or CMOS camera.

23. The observation device as claimed in claim 2, wherein the observation device is in the form of a day/night vision device.

24. The observation device as claimed in claim 1, wherein the first deflection means can be positioned, into and out of the first observation channel.

25. The observation device as claimed in claim 24, wherein the observation device comprises a first electronic or mechanical switching device for positioning the first deflection means.

26. The observation device of claim 25, wherein the first electronic or mechanical switching device swivels in and swivels out the first deflection means.

27. The observation device as claimed in claim 24, wherein the first deflection means are in the form of first deflection mirrors.

28. The observation device of claim 27, wherein the first deflection mirrors are swivellable deflection mirrors.

29. The observation device as claimed in claim 24, wherein the first deflection means has a coating at least on one side by means of which coating the reflectivity or transmittivity for predetermined wavelength ranges is increased or decreased.

30. The observation device of claim 29, wherein the first deflection means have a coating on both sides.

31. The observation device as claimed in claim 24, wherein the observation device comprises a second observation channel having a second lens unit, a second inversion unit and a second eyepiece unit and a second deflection means coordinated with the second observation channel, and
    a second optical module for emitting transmitted beams can be inserted into the observation device so that the second optical module is integrated into the observation device and can be removed therefrom by moving the second optical module, the second module thus being exchangeable, and
    the transmitted beam can be deflected via the second deflection means into the second observation channel.

32. The observation device as claimed in claim 31, wherein an amplifier channel is present for connection of the first and second observation channel.

33. The observation device as claimed in claim 24, wherein the first module comprises at least one of the following units
    graphic display,
    camera,
    thermal image device, and
    laser transmitter.

34. The observation device of claim 33, wherein the camera is a CCD or CMOS camera.

35. The observation device as claimed in claim 24, wherein the observation device is in the form of a day/night vision device.

36. The observation device of claim 24, wherein the first deflection means can be swiveled or pivoted into and out of the first observation channel.

37. The observation device as claimed in claim 1, wherein the observation device comprises a first electronic or mechanical switching device for positioning the first deflection means.

38. The observation device of claim 37, wherein the first deflection means are in the form of first deflection mirrors.

39. The observation device of claim 38, wherein the first deflection mirrors are swivellable deflection mirrors.

40. The observation device as claimed in claim 37, wherein the first deflection means has a coating at least on one side by means of which coating the reflectivity or transmittivity for predetermined wavelength ranges is increased or decreased.

41. The observation device of claim 40, wherein the first deflection means have a coating on both sides.

42. The observation device as claimed in claim 37, wherein the observation device comprises a second observation channel having a second lens unit, a second inversion unit and a second eyepiece unit and a second deflection means coordinated with the second observation channel, and a second optical module for emitting transmitted beams can be inserted into the observation device so that the second optical module is integrated into the observation device and can be removed therefrom by moving the second optical module, the second module thus being exchangeable, and the transmitted beam can be deflected via the second deflection means into the second observation channel.

43. The observation device as claimed in claim 42 wherein an amplifier channel is present for connection of the first and second observation channels.

44. The observation device as claimed in claim 37, wherein the first module comprises at least one of the following units
graphic display,
camera,
thermal image device, and
laser transmitter.

45. The observation device of claim 44, wherein the camera is a CCD or CMOS camera.

46. The observation device as claimed in claim 37, wherein the observation device is in the form of a day/light vision device.

47. The observation device of claim 37, wherein the first electronic or mechanical switching device swivels in and swivels out the first deflection means.

48. The observation device as claimed in claim 1, wherein the first deflection means is in the form of first deflection mirrors.

49. The observation device as claimed in claim 48, wherein the first deflection means has a coating at least on one side by means of which coating the reflectivity or transmittivity for predetermined wavelength ranges is increased or decreased.

50. The observation device of claim 49, wherein the first deflection means have a coating on both sides.

51. The observation device as claimed in claim 48, wherein the observation device comprises a second observation channel having a second lens unit, a second inversion unit and a second eyepiece unit and a second deflection means coordinated with the second observation channel, and a second optical module for emitting transmitted beams can be inserted into the observation device so that the second optical module is integrated into the observation device and can be removed therefrom by moving the second optical module, the second module thus being exchangeable, and the transmitted beam can be deflected via the second deflection means into the second observation channel.

52. The observation device as claimed in claim 51 wherein an amplifier channel is present for connection of the first and second observation channels.

53. The observation device as claimed in claim 48, wherein the first module comprises at least one of the following units
graphic display,
camera,
thermal image device, and
laser transmitter.

54. The observation device of clam 53, wherein the camera is a CCD or CMOS camera.

55. The observation device as claimed in claim 48, wherein the observation device is in the form of a day/night vision device.

56. The observation device of claim 48, wherein the first deflection mirrors are swivellable deflection mirrors.

57. The observation device as claimed in claim 1, wherein the first deflection means has a coating at least on one side by means of which coating the reflectivity or transmittivity for predetermined wavelength ranges is increased or decreased.

58. The observation device as claimed in claim 57, wherein the observation device comprises a second observation channel having a second lens unit, a second inversion unit and a second eyepiece unit and a second deflection means coordinated with the second observation channel, and a second optical module for emitting transmitted beams can be inserted into the observation device so that the second optical module is integrated into the observation device and can be removed therefrom by moving the second optical module, the second module thus being exchangeable, and the transmitted beam can be deflected via the second deflection means into the second observation channel.

59. The observation device as claimed in claim 58 wherein an amplifier channel is present for connection of first and second observation channel.

60. The observation device as claimed in claim 57, wherein the first module comprises at least one of the following units
graphic display,
camera,
thermal image device, and
laser transmitter.

61. The observation device of clam 60, wherein the camera is a CCD or CMOS camera.

62. The observation device as claimed in claim 57, wherein the observation device is in the form of a day/night vision device.

63. The observation device of claim 57, wherein the first deflection means have a coating on both sides.

64. The observation device as claimed in claim 1, wherein the first module comprises at least one of the following units
a graphic display,
a camera,
a thermal image device, and
a laser transmitter.

65. The observation device as claimed in claim 64, wherein the observation device is in the form of a day/night vision device.

66. The observation device as claimed in claim 64, wherein the observation device comprises a second observation channel having a second lens unit, a second inversion unit and a second eyepiece unit and a second deflection means coordinated with the second observation channel, and an amplifier channel is present for connection of the first and second observation channel.

67. The observation device as claimed in claim 64, wherein the observation device comprises a second observation channel having a second lens unit, a second inversion unit and a second eyepiece unit and a second deflection means coordinated with the second observation channel, and optical beams received in the first or second observation channel can be observed as an observed image, and transmitted beams emitted by the second optical module can be observed in the second observation channel as a module image, observed image and module image having the same imaging scale.

68. The observation device of clam 64, wherein the camera is a CCD or CMOS camera.

69. The observation device as claimed in claim 1, wherein the observation device is in the form of a day/night vision device.

70. The observation device as claimed in claim 69, wherein the observation device comprises a second observation channel having a second lens unit, a second inversion unit and a second eyepiece unit and a second deflection means coordinated with the second observation channel, and an amplifier channel is present for connection of the first and second observation channel.

71. The observation device as claimed in claim 69, wherein the observation device comprises a second observation channel having a second lens unit, a second inversion unit and a second eyepiece unit and a second deflection means coordinated with the second observation channel, and optical beams received in the first or second observation channel can be observed as an observed image, and transmitted beams emitted by the second optical module can be observed in the second observation channel as a module image, observed image and module image having the same imaging scale.

72. The observation device of claim 1, wherein the optical beams can be projected into the observer's eye via a first lens unit, inversion unit and the first eyepiece unit coordinated with the first observation channel.

* * * * *